United States Patent
Ohsawa et al.

(10) Patent No.: US 6,345,309 B2
(45) Date of Patent: Feb. 5, 2002

(54) COMMUNICATION-TERMINAL MANAGEMENT SYSTEM WITH STORAGE-PROCESSING-SYSTEM NETWORK AND REAL-TIME-PROCESSING-SYSTEM NETWORK AND A COMMUNICATION TERMINAL FOR THESE NETWORKS

(75) Inventors: Noriyuki Ohsawa; Isamu Kitagawa, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/108,889

(22) Filed: Jul. 1, 1998

(30) Foreign Application Priority Data

Feb. 10, 1998 (JP) .......................................... 10-028780

(51) Int. Cl.⁷ .............................................. G06F 13/00
(52) U.S. Cl. ........................ 709/250; 713/340; 714/14
(58) Field of Search ................................ 709/217, 103, 709/223, 224, 250, 313, 319, 329; 713/300, 330, 340; 714/10, 11, 14, 15, 20

(56) References Cited

U.S. PATENT DOCUMENTS

| | | | | | |
|---|---|---|---|---|---|
| 4,611,289 A | * | 9/1986 | Coppola | ..................... | 364/492 |
| 5,008,805 A | * | 4/1991 | Fiebig et al. | ................ | 364/184 |
| 5,375,246 A | * | 12/1994 | Kimura et al. | ............... | 365/229 |
| 5,652,891 A | * | 7/1997 | Kitamura et al. | ........... | 713/324 |
| 5,655,070 A | * | 8/1997 | Suwa et al. | .................... | 714/22 |
| 5,726,911 A | * | 3/1998 | Canada et al. | ................ | 702/32 |
| 5,845,150 A | * | 12/1998 | Henion | ......................... | 710/19 |
| 6,041,414 A | * | 3/2000 | Kikuchi | ...................... | 713/300 |

FOREIGN PATENT DOCUMENTS

JP          58-138155          8/1983

* cited by examiner

*Primary Examiner*—Viet D. Vu
(74) *Attorney, Agent, or Firm*—Rosenman & Colin LLP

(57) ABSTRACT

A communication management node checks a condition of a complex communication terminal apparatus when the complex communication terminal apparatus is connected with a real-time-processing-system network, selects and generates control software and setting information data in accordance with the condition of the complex communication terminal apparatus, and downloads the control software and setting information data into the complex communication terminal apparatus via the real-time-processing-system network, so that the complex communication terminal apparatus acts as a terminal in the real-time-processing-system network.

13 Claims, 10 Drawing Sheets

FIG. 9

| | TIME | PLACE | CONTENTS |
|---|---|---|---|
| 1 | 97/08/20 09:01:00 | BOARD | POWER-ON |
| 2 | 97/08/20 09:01:01 | BOARD | NETWORK-POWER-ON |
| 3 | 97/08/20 09:02:00 | BOARD | TERMINAL-POWER-ON |
| 4 | 97/08/20 09:10:00 | TERM->BOARD | CONTROL-START |
| 5 | 97/08/20 09:11:00 | NET->BOARD | INCOMING-CALL |
| 6 | 97/08/20 09:11:00 | BOARD->TERM | INCOMING-CALL |
| 7 | 97/08/20 09:11:05 | TERM->BOARD | ANSWER-CALL |
| 8 | 97/08/20 09:11:06 | BOARD->TERM | ANSWER-CALL |
| 9 | 97/08/20 09:12:00 | NET->BOARD | CALL-CONNECT |
| 10 | 97/08/20 09:12:00 | BOARD->TERM | CALL-CONNECT |
| 11 | 97/08/20 09:15:00 | BOARD | TERMINAL-POWER-OFF |
| 12 | 97/08/20 09:15:00 | BOARD | POWER-CHANGE(TERM_POW->NET_POW) |
| 13 | 97/08/20 09:15:00 | BOARD | CONTROL-CHANGE(TERM_CTL->EXT_DEV) |
| | .. | .. | .. |

F I G. 1 0
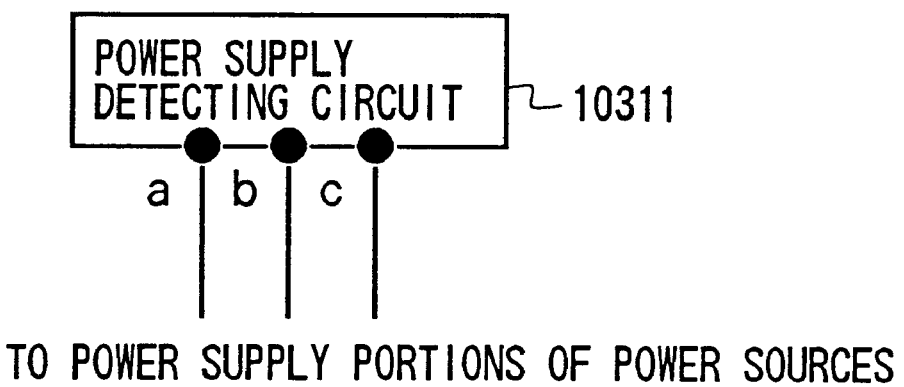
TO POWER SUPPLY PORTIONS OF POWER SOURCES

COMMUNICATION-TERMINAL MANAGEMENT SYSTEM WITH STORAGE-PROCESSING-SYSTEM NETWORK AND REAL-TIME-PROCESSING-SYSTEM NETWORK AND A COMMUNICATION TERMINAL FOR THESE NETWORKS

BACKGROUND OF THE INVENTION

1. Field of the Invention

The present invention relates to a communication-terminal management system and a communication terminal, and, in particular, to a communication-terminal management system having a storage-processing-system network, a real-time-processing-system network, a communication terminal which acts as a terminal of these two networks, and a communication management node of the real-time-processing-system network, and to the communication terminal which is a part of this system.

2. Description of the Related Art

Management of a network interface portion of a complex communication terminal apparatus acting as a terminal of-a storage-processing-system network and a real-time-processing-system network in the related art (for example, setting of an operation environment of a LAN interface board, modem and so forth of a personal computer) is performed in accordance with instructions or the like supplied from a central processing unit (CPU) of the complex communication terminal apparatus. Accordingly, in order to perform complete management, both the CPU and the interface board need to operate. For this purpose, it is necessary to supply power to both the CPU and the interface board and to enable communication therebetween.

In many cases, a personal computer is used as such a complex communication terminal apparatus. When this personal computer is used for telephone calling via a telephone network, a node (for example, a private branch exchange (PBX) or the like) of the telephone network to which the personal computer belongs sets terminal environment information (such as a dial-signal type, function-button information and so forth) for personal computers belonging to the node. In response thereto, on the side of the personal computer, because communication cannot be performed without matching with the terminal environment information set by the node for the personal computer, it is necessary to study the terminal environment information set for the personal computer and to perform setting into a network interface portion of the personal computer such that the thus-set data of the network interface portion matches with the terminal environment information. Such setting into the network interface portion is performed manually (through instructions) on the personal computer which contains the network interface portion. Thus, double setting is needed, i.e, setting into the node and the setting into the personal computer.

Further, in management of a communication history, trouble information and so forth, a storage-device resource such as a memory/hard disk of the complex communication terminal apparatus is used. Therefore, when power supply to the complex communication terminal apparatus comes to be suddenly absent, a writing error of such information, or a fault of such a storage device due to a crash or the like may occur so that the communication history, trouble information and so forth is lost in many cases.

Thus, there are the following problems in the related art:

(1) It is necessary to perform setting in the complex communication terminal apparatus so as to perform setting into the network interface portion contained in the complex communication terminal apparatus after a main power supply to the complex communication terminal apparatus is started. Such setting should be performed such that set data in the network interface portion of the complex communication terminal apparatus matches with set data in the communication management node in the network. Thus, a similar setting is needed to be performed in both the complex communication terminal apparatus and communication management node. Thus, the setting is troublesome. In proportion to an increased number of the complex communication terminal apparatuses, a load to be borne by a communication manager comes to be enormous.

(2) In a case where communication history information, management information and so forth is stored in a hard disk or a memory of the complex communication terminal apparatus, when the main power supply to the complex communication terminal apparatus is absent, it is not possible to read the communication history information, management information and so forth from the hard disk or memory. As a result, there may be a case where trouble information concerning a serious trouble cannot be obtained.

SUMMARY OF THE INVENTION

The present invention has been devised in consideration of the above-described problems, and an object of the present invention is to simplify the management of the complex communication terminal apparatus and to improve the efficiency of maintenance work for the complex communication terminal apparatus.

A complex-communication-terminal-apparatus management system, according to the present invention, comprises:

a storage-processing-system network 102;

a real-time-processing-system network 101;

a complex communication terminal apparatus 103 acting as a terminal of the two networks; and a real-time-processing-system-network communication management node 104, wherein the communication management node checks a condition of the complex communication terminal apparatus when the complex communication terminal apparatus is connected with the real-time-processing-system network, selects and generates control software and setting information data in accordance with the condition of the complex communication terminal apparatus, and downloads the control software and setting information data into the complex communication terminal apparatus via the real-time-processing-system network, so that the complex communication terminal apparatus acts as a terminal in the real-time-processing-system network.

In this arrangement, the communication management node checks a condition of the complex communication terminal apparatus when the complex communication terminal apparatus is connected with the real-time-processing-system network, selects and generates control software and setting information data in accordance with the condition of the complex communication terminal apparatus, and downloads the control software and setting information data into the complex communication terminal apparatus via the real-time-processing-system network, so that the complex communication terminal apparatus acts as a terminal in the real-time-processing-system network. As a result, management of the complex communication terminal apparatus in the networks can be simplified, and also, the efficiency of a maintenance work of the complex communication terminal can be improved.

A complex communication terminal apparatus 103, according to another aspect of the present invention, acts as a terminal of a storage-processing-system network 102 and a real-time-processing-system network 101, has power supplied thereto from any one of a plurality of power sources, and comprises a power supply detecting circuit 10311 and a power source switching circuit 10312, wherein the power source switching circuit switches a power source to be used from one to another among the plurality of power sources in accordance with a previously set priority order when the power supply detecting circuit detects absence of power supply of a power source which has been used.

In this arrangement, the plurality of power sources are provided, and the power source switching circuit switches a power source to be used from one to another among the plurality of power sources in accordance with a previously set priority order when the power supply detecting circuit detects absence of power supply of a power source which has been used. As a result, power supply can be continued.

A complex communication terminal apparatus, according to another aspect of the present invention, acts as a terminal of a real-time-processing-system network 101 and a storage-processing-system network 102, comprises a real-time-processing-system-network access interface device 1031 acting as an interface with the real-time-processing-system network, wherein:

the real-time-processing-system-network access interface device receives power from any one of a main power source 1036 of the complex communication terminal apparatus, an internal power source 10313 of the real-time-processing-system-network access interface device and a power supply 10319 of the real-time-processing-system network; and the real-time-processing-system-network access interface device receives power from one of the internal power source and the real-time-processing-system network when power supply of the main power source of the complex communication terminal apparatus is absent.

In this arrangement, the real-time-processing-system-network access interface device receives power from any one of a main power source of the complex communication terminal apparatus, an internal power source of the real-time-processing-system-network access interface device and the real-time-processing-system network; and the real-time-processing-system-network access interface device receives power from one of the internal power source and the real-time-processing-system network when power supply of the main power source of the complex communication terminal apparatus is absent. As a result, the real-time-processing-system-network access interface device can have power supplied thereto continuously.

A complex communication terminal apparatus 103, according to another aspect of the present invention, acts as a terminal of a real-time-processing-system network 101 and a storage-processing-system network 102, comprises a complex communication terminal apparatus body, a storage-processing-system-network access interface device 1032 acting as an interface with the storage-processing-system network and a real-time-processing-system-network access interface device 1031 acting as an interface with the real-time-processing-system network, wherein:

the real-time-processing-system-network access interface device receives power from any one of a main power source 1036 of the complex communication terminal apparatus, an internal power source 10313 of the real-time-processing-system-network access interface device and a power supply 10319 of the real-time-processing-system network; and only the real-time-processing-system-network access interface device receives power from one of the internal power source and the real-time-processing-system network when trouble occurs in the complex communication terminal apparatus body, thereby communication by the real-time-processing-system-network access interface device being enabled.

In this arrangement, the real-time-processing-system-network access interface device receives power from any one of a main power source 1036 of the complex communication terminal apparatus, an internal power source 10313 of the real-time-processing-system-network access interface device and a power supply 10319 of the real-time-processing-system network; and only the real-time-processing-system-network access interface device receives power from one of the internal power source and the real-time-processing-system network when trouble occurs in the complex communication terminal apparatus body, thereby communication by the real-time-processing-system-network access interface device being enabled. As a result, even when trouble occurs in the central processing unit of the complex communication terminal apparatus body, communication can be continued.

The real-time-processing-system-network access interface device 1031 may have an emergency control device 10317 externally provided thereto; and when trouble occurs in the complex communication terminal apparatus body 1030, power may be supplied to the emergency control device, and switching may be performed such that the emergency control device performs a communication control function instead of the complex communication terminal apparatus, thereby communication by the real-time-processing-system-network access interface device being continued.

Thereby, even when trouble occurs in the central processing unit of the complex communication terminal apparatus body, communication can be continued.

The real-time-processing-system-network access interface device 1031 may comprise a recording medium 10316; and the recording medium may have at least one of a history of at least one of communication and control in the complex communication terminal apparatus and a history of power supply in the complex communication terminal apparatus stored therein.

In this arrangement, the real-time-processing-system-network access interface device 1031 comprises a recording medium 10316, in addition to a recording medium provided in a complex communication terminal apparatus body; and the recording medium has at least one of a history of at least one of communication and control in the complex communication terminal apparatus and a history of power supply in the complex communication terminal apparatus stored therein. As a result, the history can be stored twice.

The real-time-processing-system-network access interface device 1031 may comprise a device control portion 10315 which controls the recording medium, the device control portion allowing access to the recording medium by one of another complex communication terminal apparatus 103' and a real-time-processing-system-network communication management node 104 in response to a request from the one of the another complex communication terminal apparatus and the real-time-processing-system-network communication management node.

In this arrangement, the device control portion allows access to the recording medium by one of another complex communication terminal apparatus 103' and a real-time-processing-system-network communication management node 104 in response to a request from the one of the another complex communication terminal apparatus and the real-time-processing-system-network communication management node. Thereby, even when absence of power supply occurs in the complex communication terminal apparatus body or trouble occurs in the central processing unit, at least one of the history of at least one of communication and control in the complex communication terminal apparatus and the history of power supply in the complex communication terminal apparatus, which has been stored in the real-time-processing-system-network access interface device individually, can be provided to the external apparatus or node. Further, by analyzing the history, the cause of the absence of power supply occurring in the complex communication terminal apparatus body or the trouble occurring in the central processing unit can be made to be clear.

The complex communication terminal apparatus 103 may contain the central processing unit 1033 and the real-time-processing-system-network access interface device 1031 may contain the device control portion 10315 which controls the recording medium, the device control portion outputting at least one of the history of at least one of communication and control in the complex communication terminal apparatus and the history of power supply in the complex communication terminal apparatus to one of another complex communication terminal apparatus and the real-time-processing-system-network communication management node in response to instructions given by one of the central processing unit and the device control portion.

In this arrangement, the device control portion outputs at least one of the history of at least one of communication and control in the complex communication terminal apparatus and the history of power supply in the complex communication terminal apparatus to one of another complex communication terminal apparatus and the real-time-processing-system-network communication management node in response to instructions given by one of the central processing unit and the device control portion. Thereby, it is possible to provide at least one of the history of at least one of communication and control in the complex communication terminal apparatus and the history of power supply in the complex communication terminal apparatus to the external apparatus or node when it is necessary or periodically.

Other objects and further features of the present invention will become more apparent from the following detailed descriptions when read in conjunction with the accompanying drawings.

BRIEF DESCRIPTIONS OF THE DRAWINGS

FIG. 9 illustrates an example of communication history information and trouble logging information; and FIG. 10 illustrates a power supply detecting circuit.

DETAILED DESCRIPTIONS OF THE PREFERRED EMBODIMENT

Figure 1:
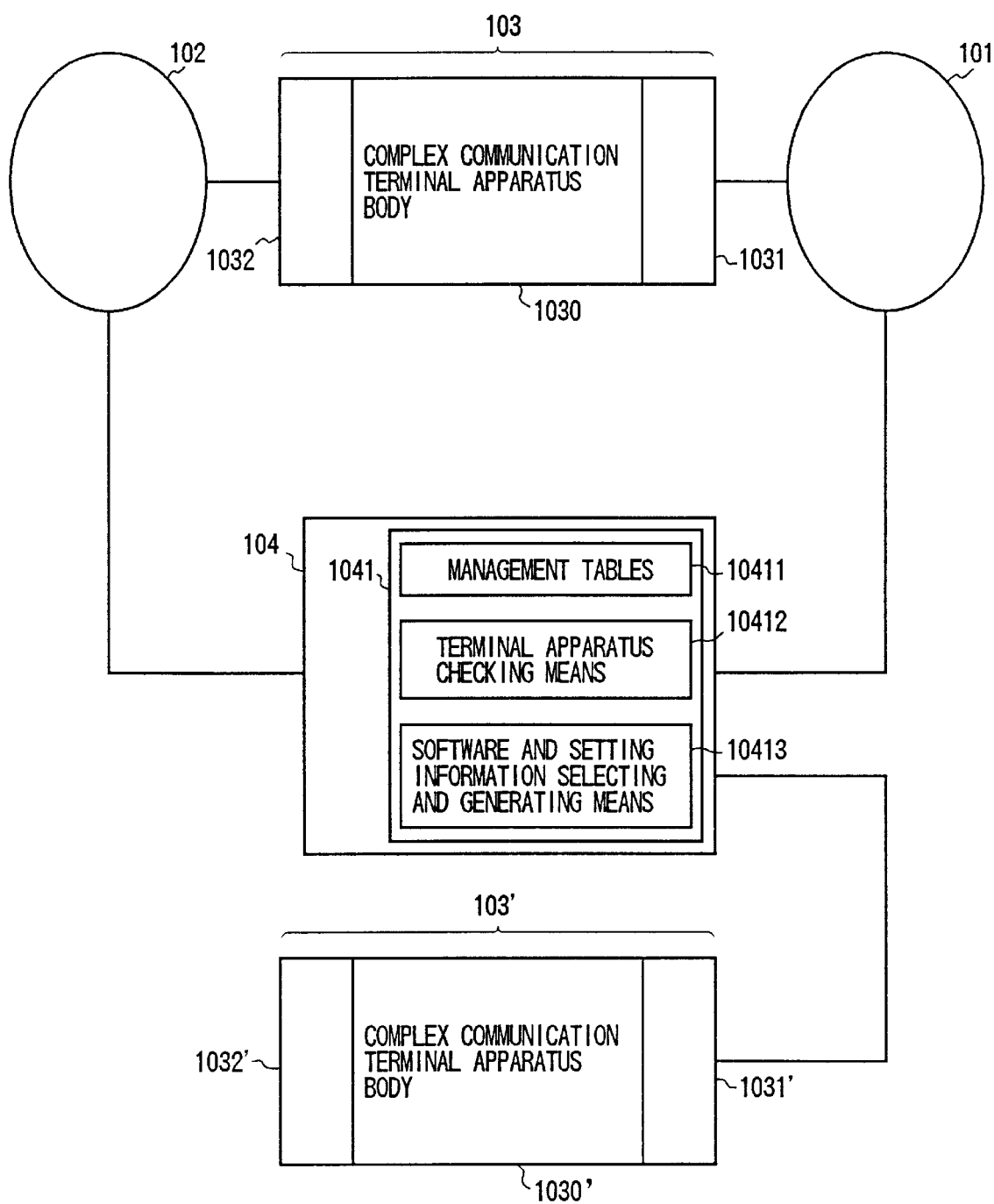
FIG. 1 shows a system arrangement of the present invention.

An embodiment of the present invention will now be described with reference to drawings. FIG. 1 shows a system arrangement in the embodiment of the present invention. The system in the embodiment of the present invention includes a real-time-processing-system network 101, provided mainly for real-time processing such as processing of sound communication of a PBX/public telephone circuit or the like, a storage-processing-system network 102, provided mainly for information storage processing such as data base access, such as a LAN (Local Area Network) of a client-server system, an ATM (Asynchronous Transfer Mode) circuit or the like, complex communication terminal apparatuses 103, 103' (terminal apparatuses such as personal computers through which a user performs data processing, sound communication processing and so forth) acting as terminals of the storage-processing-system network 102 and the real-time-processing-system network 101, and a communication management node 104.

The communication management node 104 includes a terminal management portion 1041. The terminal management portion 1041 includes management tables 10411 of management information for the respective complex communication terminal apparatuses 103, 103', means 10412 for checking the conditions of the complex communication terminal apparatuses 103, 103' and means for selecting and generating control software and setting information data in accordance with the conditions of the complex communication terminal apparatuses 103, 103' for the respective complex communication terminal apparatuses 103, 103' so that the complex communication terminal apparatuses 103, 103' act as communication terminal apparatuses in the real-time-processing-system network 101. The complex communication terminal apparatuses 103, 103' can receive the selected and produced control software and setting information data via the real-time-processing-system network 101 through downloading.

Further, the complex communication terminal apparatuses 103, 103' have real-time-processing-system-network access interface devices 1031, 1031' for connecting the apparatuses to circuits of the real-time-processing-system network 101 and storage-processing-system-network access interface devices 1032, 1032' for connecting the apparatuses to circuits of the storage-processing-system network 102, respectively. In FIG. 1, the real-time-processing-system-network access interface devices 1031, 1031' and the storage-processing-system-network access interface devices 1032, 1032' are parts of the complex communication terminal apparatuses 103, 103', respectively. However, it is also possible that the devices 1031, 1032', 1032, 1032' are externally provided to the complex communication terminal apparatuses 103, 103', which are personal computers, respectively, and, it is also possible that the devices 1031, 1031', 1032, 1032' are contained in the complex communication terminal apparatuses 103, 103'. In a case where the devices 1031, 1031', 1032, 1032' are contained in the complex communication terminal apparatuses 103, 103', respectively, each of the devices 1031, 1031', 1032, 1032' can be formed as one board inserted into a respective one of the complex communication terminal apparatuses (personal computers) 103, 103'.

In this arrangement, the storage-processing-system-network access interface device 1032 is connected with the storage-processing-system network 102, and the real-time-processing-system-network access interface device 1031 is connected with the real-time-processing-system network 101. The communication management node 104 is connected with each of the real-time-processing-system interface devices 1031, 1031' via the real-time-processing-system network 101 or directly. Further, the communication management node 104 is connected with the storage-processing-system network access interface device 1032, via the storage-processing-system network 102, when it is necessary.

Figure 2:
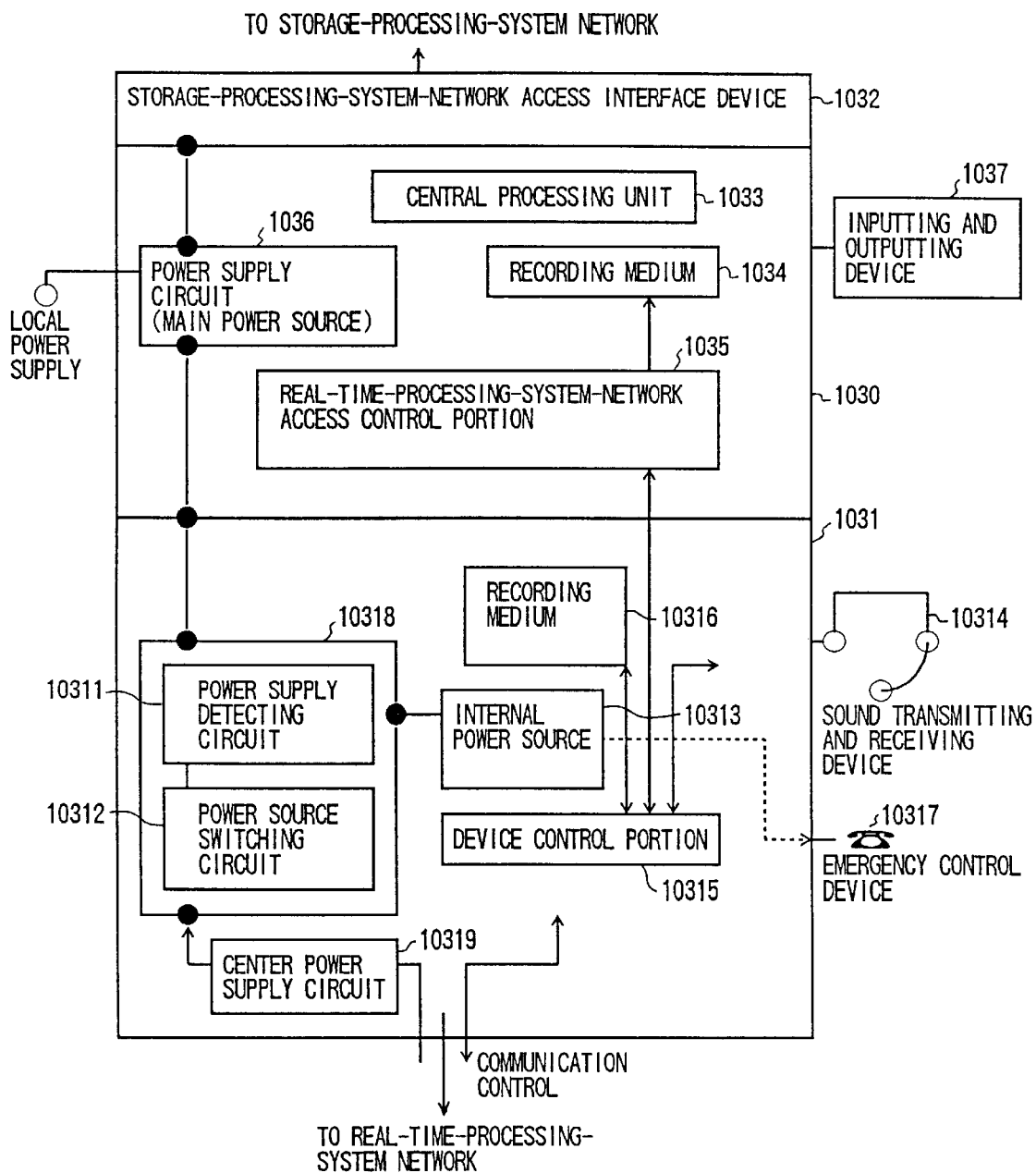
FIG. 2 shows an arrangement of a complex communication terminal apparatus.

FIG. 2 mainly shows arrangements of a complex communication terminal apparatus body 1030 such as a personal computer and the real-time-processing-network access interface device 1031 of the complex communication terminal apparatus 103. The complex communication terminal apparatus body 1030 includes a central processing unit (CPU) 1033 which performs processing control in the complex communication terminal apparatus body 1030, a recording medium 1034 such as a memory, hard disk or the like, a real-time-processing-system network access control portion 1035 which performs communication control between the complex communication terminal apparatus 103 and the real-time-processing-system network 101, and a power supply circuit 1036. Power is supplied to the power supply circuit 1036 from a local power supply (commercial power supply) and acts as a main power supply circuit for the complex communication terminal apparatus 103. Further, an inputting and outputting device 1037 such as a keyboard, a mouse, a display and so forth are provided with the complex communication terminal apparatus body 1030.

The real-time-processing-system-network access interface device 1031 has a plurality of power sources for driving the device 1031, i.e., the main power supply circuit 1036, an internal power source 10313 such as a battery, and a center power supply circuit 10319 to which power is supplied by the communication management node 104 or the like via the real-time-processing-system network 101. The real-time-processing-system-network access interface device 1031 has a power supply detecting circuit 10311 which detects the states of these power sources, and a power source switching circuit 10312 which changes a power source to be actually used from one to another among these power sources, when it is necessary. The real-time-processing-system-network access interface device 1031 can have a sound transmitting and receiving device 10314, connected thereto, which thereby enables transmission and reception of a sound, such as a transmitter/receiver of a telephone, a head set or the like. The real-time-processing-system-network access interface device 1031 further has a device control portion 10315 which is a central processing unit (CPU) which performs data transmission and reception between the complex communication terminal apparatus body 1030 and the real-time-processing-system network 101, and performs communication control between the sound transmitting and receiving device 10314 and the real-time-processing-system network 101. The real-time-processing-system-network access interface device 1031 further has a recording medium 10316 for storing data. The real-time-processing-system-network access interface device 1031 further has an emergency control device 10317 as a device which controls real-time communication (a hook-off switch operation, a dialing operation and so forth) when trouble occurs in the complex communication terminal apparatus body 1030.

Communication control of telephone calling, response to call incoming and so forth performed when communication of a sound communication or the like is started through the real-time-processing-system network 101 is performed as follows: Sending and receiving of control signals (such as a request to the network from the real-time-processing-system-network access control portion 1035 to the device control portion 10315, message of reception from the network, and so forth) is performed between the real-time-processing-system network control portion 1035 provided in the complex communication terminal apparatus body 1030 and the control portion 10315 provided in the real-time-processing-system-network access interface device 1031. Separately, communication control is performed between the device control portion 10315 and the communication management node 104 through the real-time-processing-system network 101.

The embodiment of the present invention will now be described in detail.

(1) Downloading of the control software and setting information data into the complex communication terminal apparatus:

Communication by control signals is performed between the communication management node 104 and the real-time-processing-system-network access interface device 1031. Thus, the communication management node 104 checks various types of conditions, i.e., the operation condition of the real-time-processing-system-network access control portion 1035 of the complex communication terminal apparatus body 1030 or the device control portion 10315 of the real-time-processing-system-network access interface device 1031, the version number of the control software, the setting information data, and so forth. Then, in accordance with predetermined conditions for setting into the complex communication terminal apparatus 103 belonging to the communication management node 104 or predetermined conditions for setting, such as a timing at which downloading is performed into the complex communication terminal apparatus 103, and so forth, the control software and setting information data necessary for the complex communication terminal apparatus 103 to act as a complex communication terminal apparatus in the real-time-processing-system network 101 is automatically downloaded from the communication management node 104 to the complex communication terminal apparatus 103 via the real-time-processing-system network 101.

Figure 3:
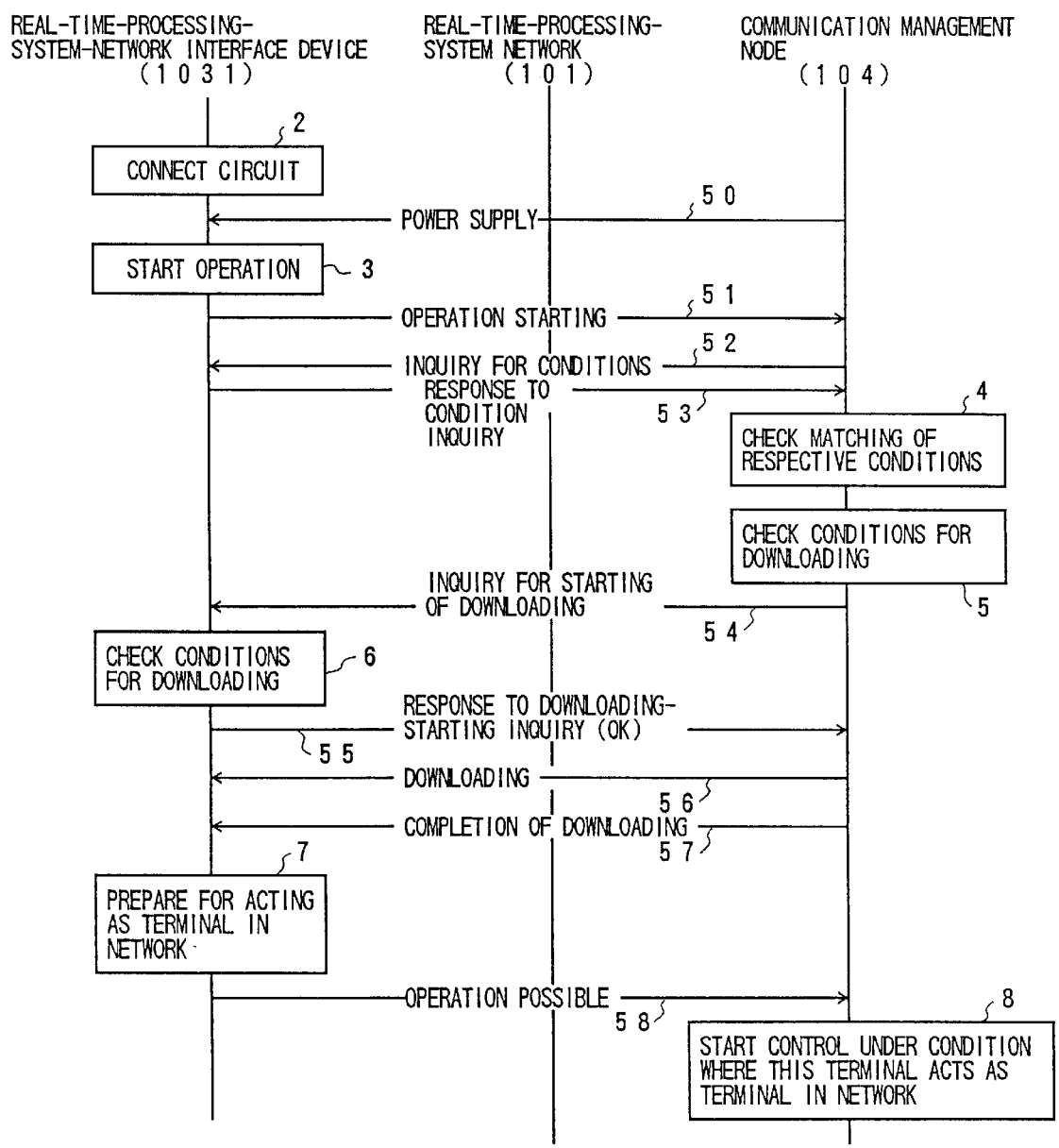
FIG. 3 shows a flowchart of downloading of software and setting information data.

FIG. 3 shows a flowchart of downloading of the control software and setting information data. The real-time-processing-system-network access interface device 1031 of the complex communication terminal apparatus 103 is connected to the real-time-processing network 101 (In a case of board setting up, the interface board is inserted into the personal computer.) (2). After the connection, the center power supply (power supply through the center power supply circuit 10319) is performed (50) from the communication management node 104 to the real-time-processing-system-network access interface device 1031 which then starts operation (3). When the real-time-processing-system network access interface device 1031 starts operation, control information of operation starting (operation starting event) is transmitted from the device control portion 10315 to the communication management node 104 (51). In response to reception of the operation starting information, the communication management node 104 recognizes the operation starting of this terminal apparatus 103, and transmits an order for inquiring about current conditions (52). In response to reception of the current-condition-inquiring order, the real-time-processing-system-network access interface device 1031 responds to the communication management node 104 so as to inform the communication management node 104 of the conditions of this terminal apparatus 103 (the version number of the software, setting information data, the condition of the power supply circuit 1036 of the complex communication terminal apparatus 103, and so forth) (53). After checking matching between the version number of the software of the communication management node 104 and the version number of the software of the terminal apparatus 103, matching between the setting on the terminal side defined in the node 104 and the setting information data recognized in the terminal apparatus 103, and so forth (4), the communication management node 104 checks conditions for downloading (such as a condition of timing at which downloading is performed and so forth) defined in the node 104 (5). Then, when the communication management node 104 determines that it is the timing of downloading, the communication management node 104 transmits an inquiry for starting downloading to the real-time-processing-system interface device 1031 (54). In response to reception of the downloading-starting inquiry, the real-time-processing-system-network access interface device 1031 checks setting conditions in the apparatus 103 (6) similarly to the case of the communication management node 104. Then, the real-time-processing-system-network access interface device 1031 transmits, to the communication management node 104, a response to the downloading-starting inquiry as to whether or not downloading can be performed (55). When the communication management node 104 receives a message that the downloading can be performed, downloading of the necessary control software and setting information data from the communication management node 104 to the real-time-processing-system-network interface device 1031 is started (56). After completion of the downloading, the communication management node 104 transmits information of the completion of the download to the real-time-processing-system-network interface device 1031 (57). After completion of processing for preparing to acts as a terminal apparatus in the real-time-processing-system network 101 (7), the real-time-processing-system-network access interface device 1031 transmits a message, that operation can be performed, to the communication management node 104 (58). After receiving the message that operation can be performed, the communication management node 104 starts control (for call incoming and so forth) under the condition where the complex communication terminal apparatus 103 acts as a terminal apparatus in the real-time-processing-system network 101.

Thus, in a case where an installation work and setting work are performed on each of a plurality of complex communication terminal apparatuses, it is not necessary to turn on the power supply circuit 1036 of the complex communication terminal apparatus body 1030 in each individual complex communication terminal apparatus 103. (By connecting to the real-time-processing-system network 101, the center power supply is performed from the communication management node 104 via the network 101.) Thus, the efficiency of the works can be improved.

Further, it is possible to perform downloading of the version number of the software, setting information data and so forth automatically to each-of the complex communication terminal apparatuses.

(2) Providing multiple power sources, monitoring power supply and switching power source:

The real-time-processing-system-network access interface device 1031 can receive power from any one of the following plurality of power sources and operates by the power supply therefrom:

A-power source: power supply from the main power supply circuit 1036 of the complex communication terminal apparatus 103;

B-power source: power supply from the communication management node 104 in the real-time-processing-system network 101 via the real-time-processing-system network 101 (center power supply; for example, power supply from PBX via a communication circuit); and C-power source: power supply from the internal power source 10313 such as a battery or the like provided in the real-time-processing-system-network access interface device 1031.

In the real-time-processing-system-network access interface device 1031, the condition of current power supply of the power sources are monitored through the power supply detecting circuit 10311. Then, when absence of power supply is detected through the power supply detecting circuit 10311, a power source to be used is switched from the currently used power source into another power source in accordance with a predetermined priority order of the power sources by the power supply switching circuit 10312. Thereby, the real-time-processing-system-network access interface device 1031 can continue operation.

Thus, during a time period during which no power is supplied from the above-mentioned A-power source, the real-time-processing-system-network access interface device 1031 can continue to receive power from another power source. Further, when trouble occurs in the complex communication terminal apparatus body 1030 during communication, communication is continued as a result of power being supplied only to the real-time-processing-system-network access interface device 1031. Setting can be possible such that communication is stopped when trouble occurs in the complex communication terminal apparatus body 1030. However, usually, the communication will be continued as mentioned above.

In order to continue communication either when power supply of the main power supply circuit 1036 is absent or when trouble occurs in the complex communication terminal apparatus body 1030, power supply to the emergency control device 10317 connected with the real-time-processing-system-network access interface device 1031 is started, as well as power supply to the real-time-processing-system-network access interface device 1031 is continued. Switching is performed such that communication control such as disconnecting a telephone circuit, calling and so forth is performed by the emergency control device 10317 instead of the real-time-processing-system-network access control portion 1035.

FIG. 10 shows the power supply detecting circuit 10311. The power supply detecting circuit 10311 of the real-time-processing-system-network access interface device 1031 has terminals 'a', 'b' and 'c' which are connected to the power sources (the above-mentioned A-power source, B-power source and C-power source). An arrangement is made such that, when power supply comes to be present at any one of these three power sources, the electric potential at the terminal connected with this power source increases. Accordingly, the condition of power supply for the real-time-processing-system-network access interface device 1031 can be detected by using the electric potentials at the terminals 'a', 'b' and 'c'.

When the electric potential at any one of these terminals 'a', 'b' and 'c' increases after a condition where the electric potential at each of all of these terminals is low, it is determined that power supply is started. Further, by monitoring the electric potentials at the terminals 'a', 'b' and 'c', the condition of power supply can be detected at any time.

Figure 4:
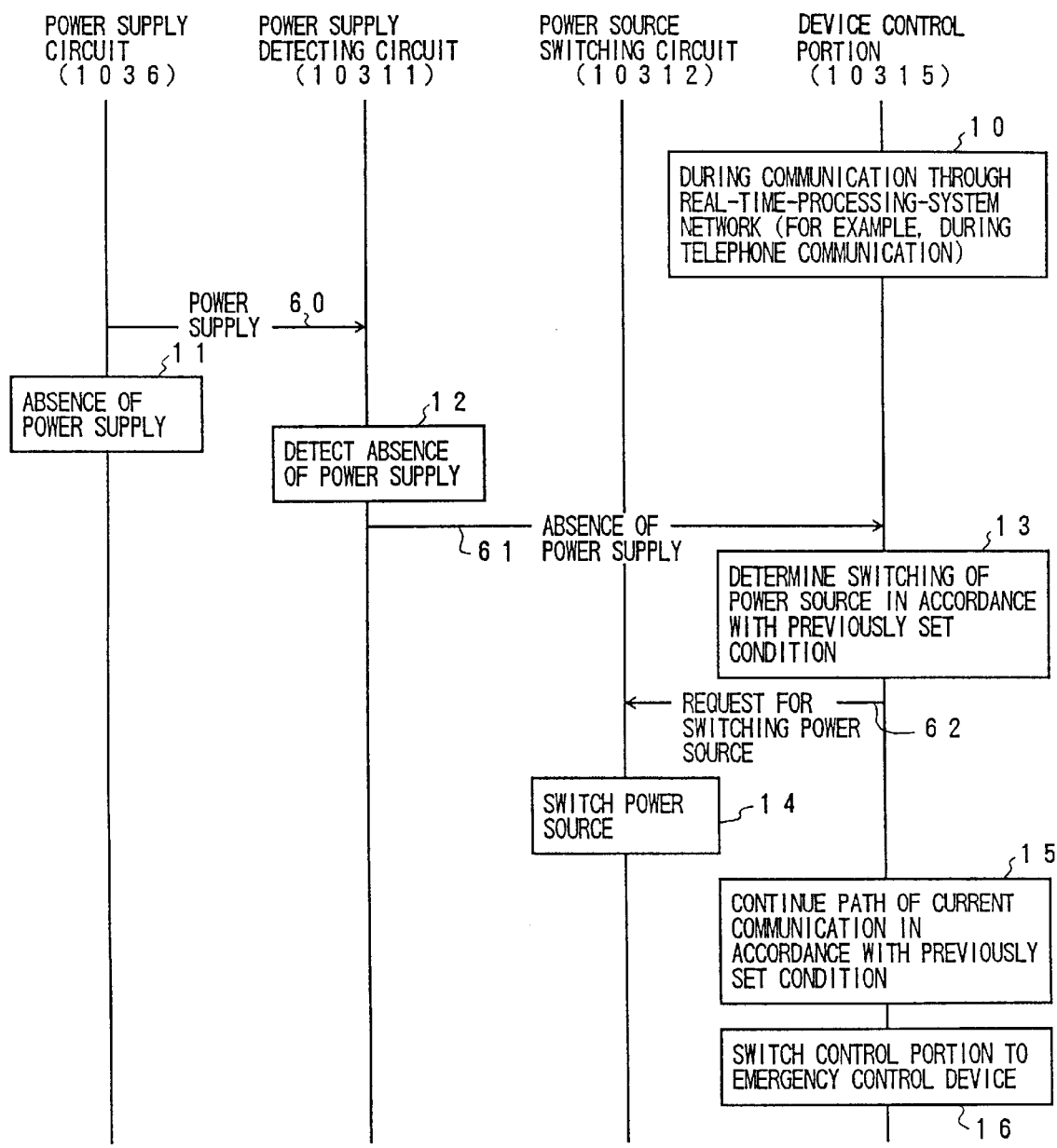
FIG. 4 shows a flowchart of monitoring and switching of power supply.

FIG. 4 shows a flowchart for monitoring of power supply and switching of the power source. The condition (presence/absence of power supply and so forth) of the power sources (A-, B- and C-power sources) provided for the real-time-processing-system-network access interface device 1031 is monitored through the power supply detecting circuit 10311 of the real-time-processing-system-network access interface device 1031 at any time during a time period during which the real-time-processing-system-network access interface device 1031 operates. For example, in the case where the real-time-processing-system-network access interface device 1031 operates by power supply from the main power supply circuit 1036 of the complex communication terminal apparatus body 1030, when the power supply of the main power supply circuit 1036 of the complex communication terminal apparatus body 1030, comes to be absent due to power failure or the like, information of the absence of power supply is sent to the device control portion 10315. In accordance with the predetermined priority order of the power sources, the device control portion 10315 selects a power source from which power is to be supplied is switched from the power source which has been used until then (the main power supply circuit 1036) to another power source. (The condition of power supply of the respective power sources (A-, B- and C-power sources) is monitored at any time, and, when any change occurs in the condition of power supply of the respective power sources, the device control portion 10315 is informed of this change immediately. Thereby, the device control portion 10315 can manage the condition of power supply of the power sources, one of which is a power source to be switched to be used.) Then, the device control portion 10315 informs the power source switching circuit 10312 of a request for switching the power source. In response to reception of this information, the power source switching circuit 10312 switches a power source to be used from the power source used until then to the power source selected by the device control portion 10315.

With reference to FIG. 4, it is assumed that power supply of the main power supply circuit 1036 comes to be absent (11) during telephone communication through the real-time-processing-system-network access interface device 1031 which receives power from the main power supply circuit 1036 of the complex communication terminal apparatus body 1030 (60). In such a case, when the power supply detecting circuit 10311 detects absence of power supply of the main power supply circuit 1036 of the complex communication terminal apparatus body 1030 (as a result, because power supply of the main power supply circuit 1036 is absent, control by the real-time-processing-system-network access control portion 1035 cannot be performed), the power supply detecting circuit 10311 informs the device control portion 10315 of the absence of power supply of the main power supply circuit 1036 (61). Then, in accordance with the previously set priority order, in order to switch the power source (13), the device control portion 10315 requests the power source switching circuit 10312 to switch the power source (62). In accordance with the request by the device control portion 10315, the power source switching circuit 10312 switches the power source (14). During the period from the detection of absence of power supply to switching of the power source in the flow shown in FIG. 4, the internal power source 10313 is used.

Thus, even when the power supply of the main power supply circuit 1036 is absent, power supply to the real-time-processing-system interface device 1031 is continued without interruption. Thereby, the telephone communication can be continued. It is possible to then stop the telephone communication in accordance with a set condition. However, usually, the telephone communication is continued. In order to continue the telephone communication without interruption, power supply to the emergency control device 10317 connected with the real-time-processing-system-network access interface device 1031 is started, while power supply to the real-time-processing-system-network access interface device 1031 is continued. Switching is performed such that communication control such as stopping of telephone communication, calling and so forth is performed by the emergency control device 10317 instead of the real-time-processing-system-network access control portion 1035 (16). Thus, the communication is continued.

Figure 8:
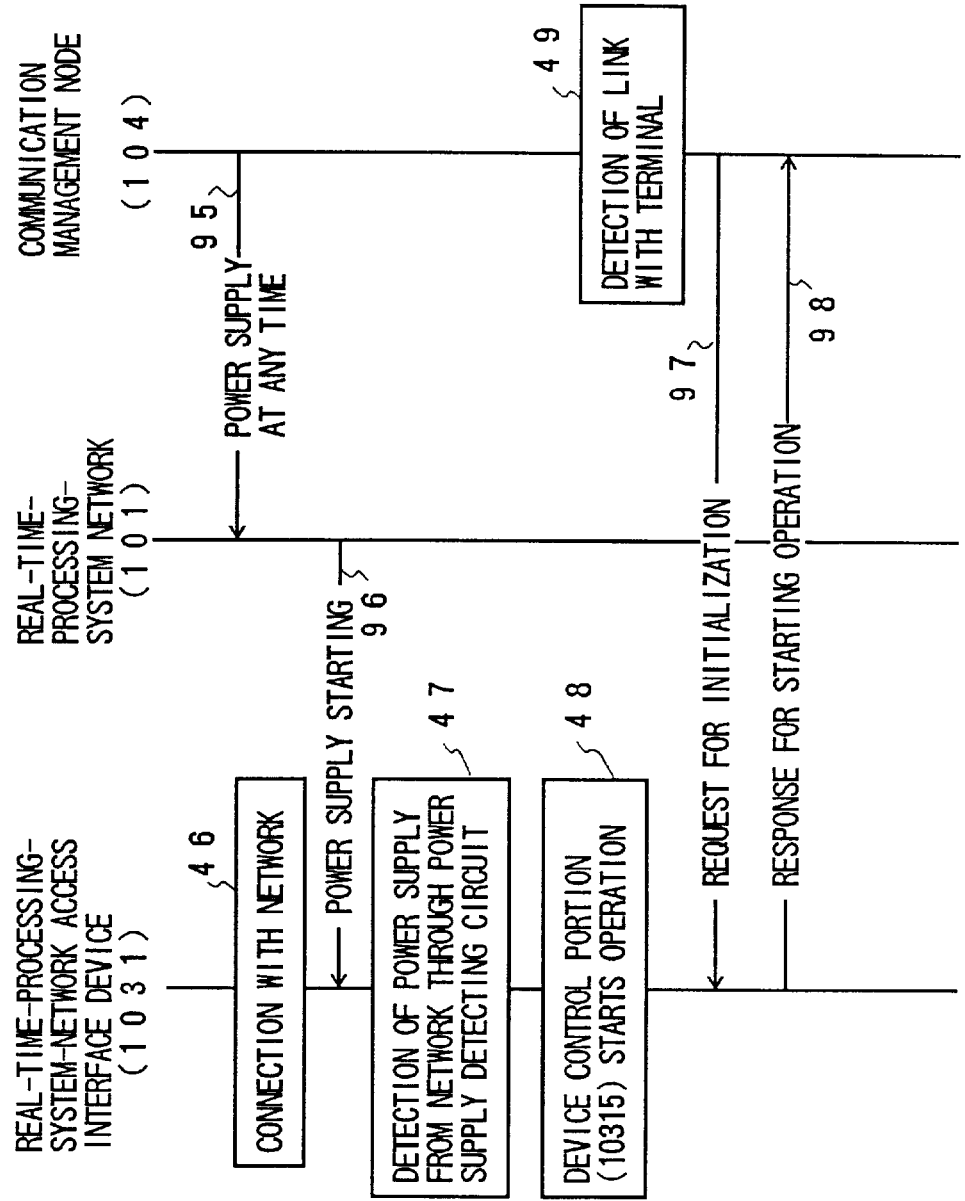
FIG. 8 shows an operation sequence of a real-time-processing-system-network interface device.

FIG. 8 shows an operation sequence when the real-time-processing-system-network access device 1031 has been connected with the real-time-processing-system network 101. Power is supplied from the communication management node 104 to the real-time-processing-system network 101 at any time (center power supply through the center power supply circuit 10319) (95). In a case where the complex communication terminal apparatus 103 is not connected with the real-time-processing-system network 101, the communication management node 104 determines that the complex communication terminal apparatus 103 has not been connected with the real-time-processing-system network 101 because the open state of a circuit is detected. When the real-time-processing-system-network access interface device 1031 is connected with the real-time-processing-system network 101 (46), power is supplied from the real-time-processing-system network 101 (96), and this center power supply is detected through the power supply detecting circuit 10311 of the real-time-processing-system-network device 1031 (47). Then, the software of the real-time-processing-system-network access interface device 1031 starts to be executed so that the real-time-processing-system-network access interface device 1031 starts operation as an access device (48). The communication management node 104 detects that a link is formed with the complex communication terminal apparatus 103 (49), and requests the complex communication terminal apparatus 103 to perform initialization (97). In response to the initialization request from the communication management node 164, the complex communication terminal apparatus 103 informs the communication management node 104 of starting of operation by the complex communication terminal apparatus 103 (98). Then, the complex communication terminal apparatus 103 starts operation as a terminal of the real-time-processing-system network 101.

Accordingly, the real-time-processing-system-network access interface device 1031 can start operation regardless of the condition of the power supply in the complex communication terminal apparatus body 1030 (personal computer) with which the real-time-processing-system-network access interface device 1031 is connected.

Thus, although the functions as the network terminal depend on the condition of power supply of the complex communication terminal apparatus body 1030 in the related art, a communication state can be continued and communication control can be continued as a result of monitoring of the condition of power supply and switching of the power source when it is necessary in the embodiment of the present invention. Thus, according to the embodiment of the present invention, reliability can be improved in processing in which real-time operation is required.

(3) Storage and outputting of history of communication, control and power supply:

The history of communication and control performed by the complex communication terminal apparatus in the real-time-processing-system network 101 (for example, history of communication and control performed between the real-time-processing-system-network access control portion 1035 and the real-time-processing-system-network access interface device 1031 and history of communication and control performed between the device control portion 10315 provided in the real-time-processing-system-network access interface device 1031 and the real-time-processing-system network 101) is stored in the recording medium 1034 in the complex communication terminal apparatus body 1030, and also, is stored in the recording medium 10316 provided in the real-time-processing-system-network access interface device 1031. Further, even in a case where the main power supply circuit 1036 does not supply power, as described in (2) 'Providing multiple power sources, monitoring power supply and switching power source', the real-time-processing-system-network access interface device 1031 can have power supplied thereto, and can operate as a terminal in the real-time-processing-system network 101. As a result, in such a case, history of communication performed between the device control portion 10315 provided in the real-time-processing-system-network access interface device 1031 and the real-time-processing-system network 101 is stored in the recording medium 10316.

Figure 5:
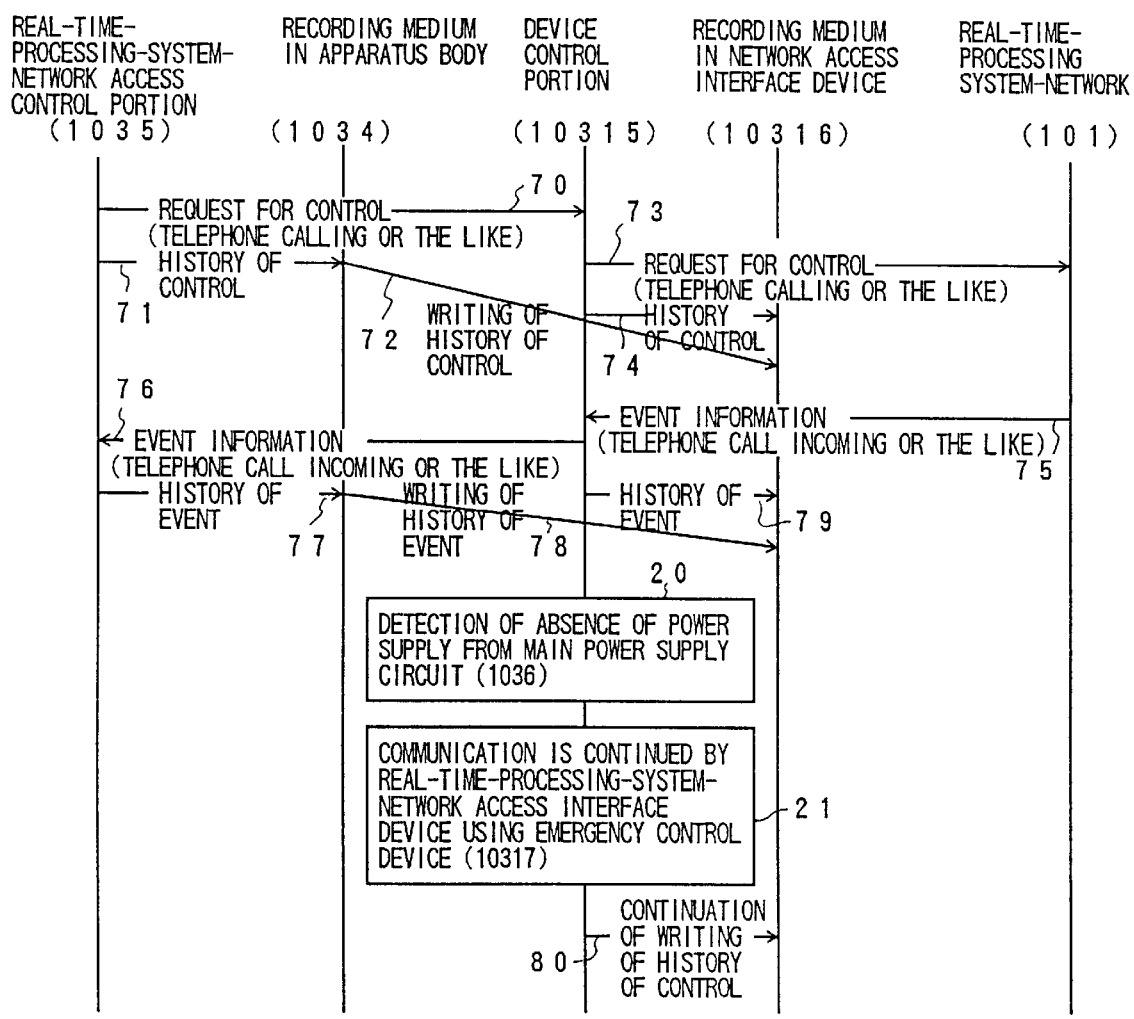
FIG. 5 shows a flowchart of storage of history information.

FIG. 5 shows a flowchart of storage of history information. During a period during which the complex communication terminal apparatus 103 operates as a terminal of the real-time-processing-system network 101, control information such as telephone calling, response to call incoming and so forth is output from the real-time-processing-system-network access control portion 1035 to the device control portion 10315 of the real-time-processing-system-network access interface device 1031 (70). With regard to the control information, whether or not previously set history information is to be stored is previously determined. When the history information is stored, at the same time at which the history information is stored in the recording medium 1034 in the complex communication terminal apparatus body 1030 (71), the real-time-processing-system-network access control portion 1035 writes the history information into the recording medium 10316 provided in the real-time-processing-system-network access interface device 1031 (72). With regard to information of an event such as telephone call incoming or the like sent from the device control portion 10315 to the real-time-processing-system-network access control portion 1035 (76), history of the event is stored similarly in the recording medium 1034 (77) and in the recording medium 10316 (78).

When the device control portion 10315 provided in the real-time-processing-system access interface device 1031 receives a request for control from the real-time-processing-system access control portion 1035, the device control portion 10315 sends a request for control (calling, response to call incoming or the like) to the real-time-processing-system network 101 (73), and stores history of control in the recording medium 10316 (74). With regard to information of an event such as telephone call incoming or the like coming from the real-time-processing-system network 101 to the device control portion 10315 (75), history of the event is stored similarly in the recording medium 10316 (79).

Further, when the power supply detecting circuit 10311 detects absence of power supply of the main power supply circuit 1036 (20), communication can be continued by the real-time-processing-system-network access interface device 1031 and the emergency control device 10317, as mentioned above. History of the power supply in this case can be stored in the recording medium 10316 of the real-time-processing-system-network access interface device 1031 (80).

In order to obtain data stored in the recording medium 10316 provided in the real-time-processing-system-network access interface device 1031, an external apparatus, such as the communication management node 104, the other complex communication terminal apparatus 103', or the like, accesses the device control portion 10315 provided in the real-time-processing-system-network access interface device 1031 and requests the device control portion 10315 to send data stored in the recording medium 10316. The device control portion 10315 reads data stored in the recording medium 10316 and sends the read data to the external apparatus. Thus, the external apparatus can obtain history of communication, control and power supply. Further, even in a case where the main power supply circuit 1036 does not supply power, as described in (2) 'Providing multiple power sources, monitoring power supply and switching power source', the real-time-processing-system-network access interface device 1031 can have power supplied thereto, and can operate as a terminal in the real-time-processing-system network 101. Therefore, In this case, the external apparatus accesses the device control portion 10315 provided in the real-time-processing-system-network access interface device 1031 connected with the complex communication terminal apparatus body 1030, and can obtain history of communication, control and power supply.

Figure 6:
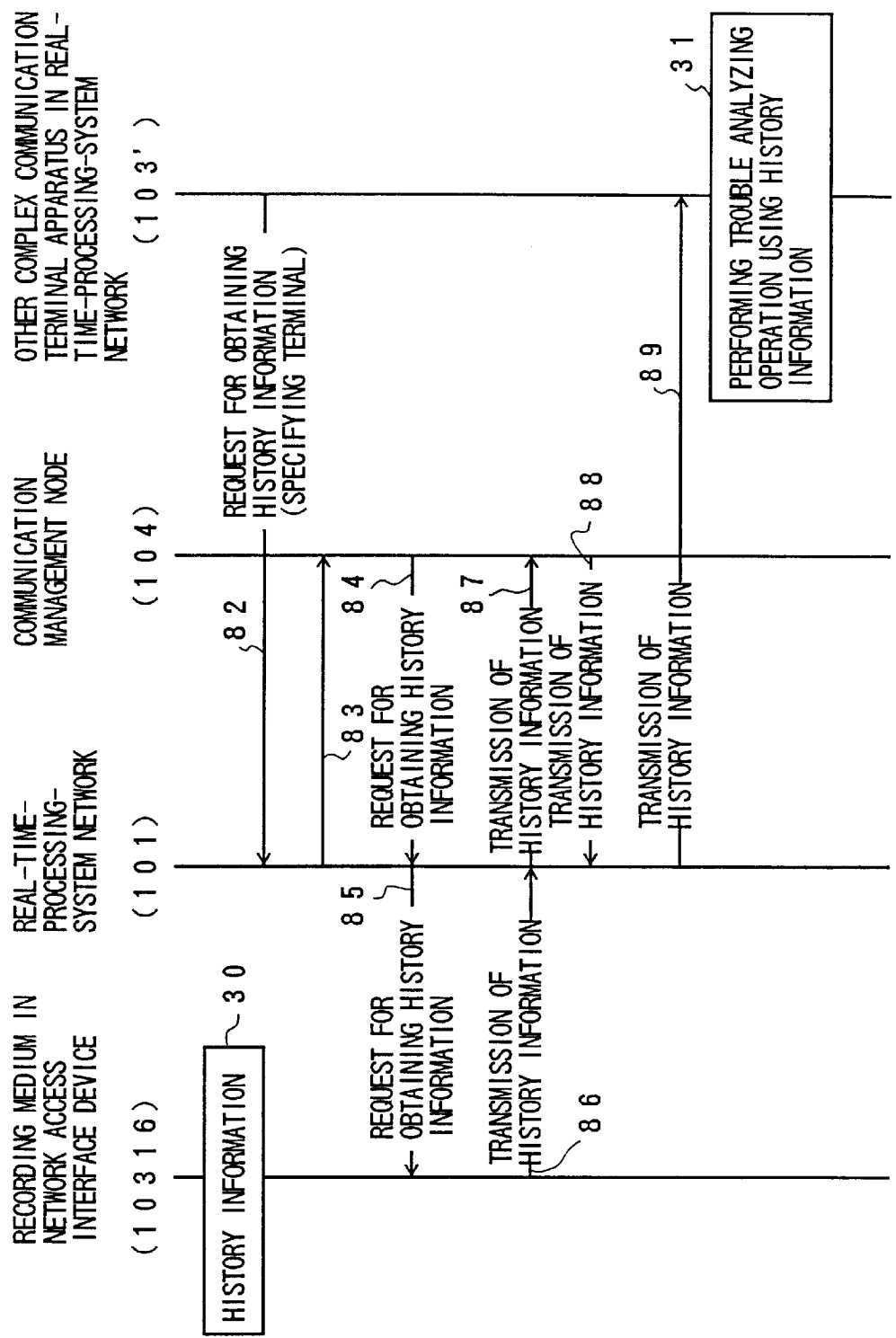
FIG. 6 shows a flowchart of an external apparatus or node obtaining the history information.

FIG. 6 shows a flowchart of a case where the external apparatus obtains the history information. When the other complex communication terminal apparatus 103' in the real-time-processing-system network 101 attempts to obtain the history information stored in the recording medium 10316 provided in the real-time-processing-system-network access interface device 1031, the other complex communication terminal apparatus 103' specifies a terminal (in this case the complex communication terminal apparatus 103) and outputs a request for obtaining the history information (by an extension number) to the communication management node 104 (82, 83). The communication management node 104 outputs the request for obtaining the history information, to which information as to which terminal has first output the request is given (request origin), to the complex communication terminal apparatus 103 (84, 85). The complex communication terminal apparatus 103 determines whether or not information can be transmitted to the terminal which has first output the request (request origin, in this case, the apparatus 103'). Then, when determining that information can be transmitted to the terminal which has first output the request, the complex communication terminal apparatus 103 transmits the history information (86, 87). The communication management node 104 transfers the received history information to the other complex communication terminal apparatus 103' (88, 89). In this embodiment, it is possible that the communication management node 104 first outputs the request for obtaining the history information. Further, it is possible that the terminal or the node, which first outputs the request for obtaining the history information (request origin), outputs the request manually or automatically in accordance with a previously set condition (timing at which the request is output, and so forth).

It is also possible that, regardless of the request by the external apparatus such as the other complex communication terminal apparatus 103' or the like, the device control portion 10315 provided in the real-time-processing-system-network access interface device 1031 connected with the complex communication terminal apparatus body 1030 outputs data stored in the recording medium 10316 provided in the real-time-processing-system-network access interface device 1031 to the external apparatus periodically. It is also possible that, in response to instructions input through the inputting and outputting device 1037 provided externally to the complex communication terminal apparatus 103, the central processing unit 1033 requests the real-time-processing-system-network access control portion 1035 so that the device control portion 10315 reads data stored in the recording medium 10316, and outputs the read data to the inputting and outputting device 1037 or the recording medium 1034.

Figure 7:
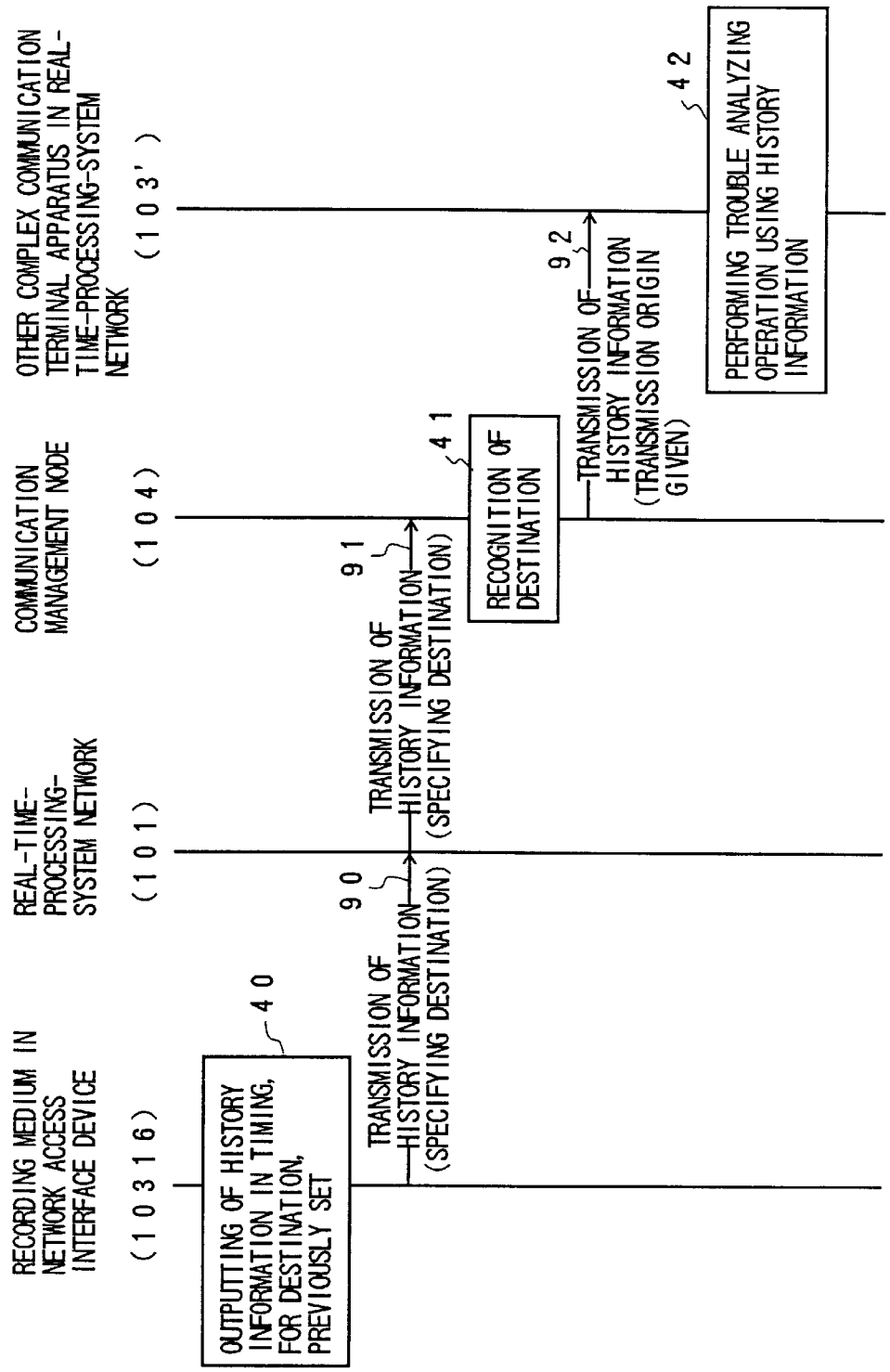
FIG. 7 shows a flowchart of outputting of the history information.

FIG. 7 shows a flowchart of outputting of the history information. The history information stored in the recording medium 10316 provided in the real-time-processing-system-network access interface device 1031 is transmitted to the communication management node 104 via the real-time-processing-system network 101, in a timing, for a terminal to which the history information is to be transferred (90, 91), these timing and terminal being previously set in the real-time-processing-system-network access interface device 1031. The communication management node 104 recognizes a destination to which the history information is to be output (41) and transfers the received history information to the destination to which the history information is to be output (92). In a case where the other complex communication terminal apparatus 103' is the terminal to which the history information is to be transferred, whether or not the history information can be received is determined through communication between the communication management node 104 and the other complex communication terminal apparatus 103'. Further, it is possible that this transfer operation is performed by a manual operation through the inputting and outputting device 1037 of the complex communication terminal apparatus 103. It is also possible that the destination to which the history is to be transferred is the recording medium 1034 in the complex communication terminal apparatus body 1030.

FIG. 9 shows an example of the history information. In the figure, 'TIME' means a time at which an item of the history information has occurred, 'PLACE' means a place at which the item of the history information has occurred, 'CONTENTS' mean the contents of the item of the history information. 'BOARD' means the real-time-processing-system-network access interface device 1031, 'NET' means the real-time-processing-system network 101, and 'TERM' means the complex communication terminal apparatus 103. The arrows means flow of the control information.

The contents shown in FIG. 9 will now be described line by line.

Line 1: Power supply in the real-time-processing-system-network access interface device 1031 is started.

Line 2: Power supply from the real-time-processing-system network 101 is detected.

Line 3: Power supply from the complex communication terminal apparatus body 1030 is detected.

Line 4: A request for starting control is sent from the complex communication terminal apparatus body 1030 to the real-time-processing-system-network access interface device 1031.

Line 5: Information of telephone call incoming is sent from the real-time-processing-system network 101 to the real-time-processing-system-network access interface device 1031.

Line 6: The information of telephone call incoming is sent from the real-time-processing-system-network access interface device 1031 to the complex communication terminal apparatus body 1030.

Line 7: Response to the incoming call is requested from the complex communication terminal apparatus body 1030 to the real-time-processing-system-network access interface device 1031.

Line 8: Response to the call incoming is requested from the real-time-processing-system-network access interface device 1031 to the real-time-processing-system network 101.

Line 9: Information of connection of sound call is sent from the real-time-processing-system network 101 to the real-time-processing-system-network access interface device 1031.

Line 10: The information of connection of sound call is sent from the real-time-processing-system-network access interface device 1031 to the complex communication terminal apparatus body 1030.

Line 11: Absence of power supply in the complex communication terminal apparatus body 1030 is detected by the real-time-processing-system-network access interface device 1031.

Line 12: A power source for operation of the real-time-processing-system-network access interface device 1031 is switched to the center power supply from the complex communication terminal apparatus body 1030.

Line 13: Switching is performed such that the emergency control device 10317 connected to the real-time-processing-system-network access interface device 1031 comes to perform a network control operation.

Thus, although the history information for managing history of trouble and analyzing trouble can be obtained on the side of the communication management node 104 in the related art, the history information can be easily obtained from a remote terminal at which trouble has occurred in the embodiment of the present invention. Thereby, it is possible to perform detailed management of terminals.

By using the embodiment of the present invention, it is possible to manage/set up, as a whole, and analyze troubles for remote complex communication terminal apparatuses, each of which is similar to the complex communication terminal apparatus 103. Thus, efficiency of the maintenance work can be improved.

Further, the present invention is not limited to the above-described embodiment, and variations and modifications may be made without departing from the scope of the present invention.

The contents of the basic Japanese Patent Application No. 10-028780, filed on Feb. 10, 1998, are hereby incorporated by reference.

What is claimed is:

1. A communication terminal, acting as a terminal of a real-time-processing-system network and a storage-processing-system network, comprising a real-time-processing-system-network, comprising a real-time-processing-system-network access interface device acting as an interface with said real-time-processing-system network, wherein:

said real-time-processing-system-network access interface device receives power from any one of a main power source of said communication terminal, an internal power source of said communication terminal, an internal power source of said real-time-processing-system-network access interface device and via a real-time communication line coupled to said real-time-processing-system network; and said real-time-processing-system-network access interface device receives power from one of said internal power source and said real-time-processing-system network when power supply of said main power source of said communication terminal is absent.

2. A communication terminal, acting as a terminal of a real-time-processing-system network and a storage-processing-system network, comprising a communication terminal body, a storage-processing-system-network access interface device acting as an interface with said storage-processing-system network and a real-time-processing-system-network access interface device acting as an interface with said real-time-processing-system network, wherein said real-time-processing-system-network access interface device receives power from any one of a main power source of said communication terminal, an internal power source of said real-time-processing-system network access interface device and via a real-time communication line coupled to said real-time-processing-system network; and only said real-time-processing-system-network access interface device receives power from one of said internal power source and said real-time-processing-system network when trouble occurs in said communication terminal body, thereby communication by said real-time-processing-system-network access interface device being enabled.

3. The communication terminal, according to claim 2, wherein:

said real-time-processing-system-network access interface device has an emergency control device externally provided thereto; and when trouble occurs in said communication terminal body, power is supplied to said emergency control device, switching is performed such that said emergency control device performs a communication control function instead of said communication terminal, thereby communication by said real-time-processing-system-network access interface device being continued.

4. The communication terminal, according.to claim 1, wherein:

said real-time-processing-system-network access interface device comprises a recording medium; and said recording medium has at least one of a history of at least one of communication and control in said communication terminal and a history of power supply in said communication terminal stored therein.

5. The communication terminal, according to claim 2, wherein:

said real-time-processing-system-network access interface device comprises a recording medium; and said recording medium has at least one of a history of at least one of communication and control in said communication terminal and a history of power supply in said communication terminal stored therein.

6. The communication terminal, according to claim 4, wherein said real-time-processing-system-network access interface device comprises a device control portion which controls said recording medium, said device control portion allowing access to said recording medium by one of another communication terminal and a real-time-processing-system-network communication management node in response to a request from said one of said another communication terminal and said real-time-processing-system-network communication management node.

7. The communication terminal, according to claim 5, wherein said real-time-processing-system-network access interface device comprises a device control portion which controls said recording medium, said device control portion allowing access to said recording medium by one of another communication terminal and a real-time-processing-system-network communication management node in response to a request from said one of said another communication terminal and said real-time-processing-system-network communication management node.

8. A communication terminal, acting as a terminal of a storage-processing-system network and a real-time-processing-system network, having power supplied thereto from any one of a plurality of power sources, comprising:

a power supply detecting circuit, a power source switching circuit, and a real-time-processing-system-network access interface device acting as an interface with said real-time-processing-system network, wherein said power source switching circuit switches a power source to be used from one to another among said plurality of power sources in accordance with a previously set priority order when said power supply detecting circuit detects absence of power supply of a power source which has been used, said real-time-processing-system-network access interface device comprises a recording medium, and said recording medium has at least one of a history of at least one of communication and control in said communication terminal and a history of power supply in said communication terminal stored therein, and said communication terminal contains a central processing unit and said real-time-processing-system-network access interface device contains a device control portion which controls said recording medium, said device control portion outputting at least one of the history of at least one of communication and control in said communication terminal and the history of power supply in said communication terminal to one of another communication terminal and said real-time-processing-system-network communication management node in response to instructions given by one of said central processing unit and said device control portion.

9. The communication terminal, according to claim 4, wherein said communication terminal contains a central processing unit and said real-time-processing-system-network access interface device contains a device control portion which controls said recording medium, said device control portion outputting one of the history of one of communication and control in said communication terminal and the history of power supply in said communication terminal to one of another communication terminal and said real-time-processing-system-network communication management node in response to instructions given by one of said central processing unit and said device control portion.

10. The communication terminal, according to claim 5, wherein said communication terminal contains a central processing unit and said real-time-processing-system-network access interface device contains a device control portion which controls said recording medium, said device control portion outputting one of the history of one of communication and control in said communication terminal and the history of power supply in said communication terminal to one of another communication terminal and said real-time-processing-system-network communication management node in response to instructions given by one of said central processing unit and said device control portion.

11. The communication terminal of claim 1, wherein the real-time processing system network comprises real-time processing of sound communication.

12. The communication terminal of claim 2, wherein the real-time processing system network comprises real-time processing of sound communication.

13. The communication terminal of claim 3, wherein the real-time processing system network comprises real-time processing of sound communication.

\* \* \* \* \*